(12) United States Patent
Cheong et al.

(10) Patent No.: US 9,746,838 B2
(45) Date of Patent: Aug. 29, 2017

(54) METHOD AND APPARATUS FOR CONTENT MANAGEMENT

(71) Applicant: Samsung Electronics Co. Ltd., Suwon-si, Gyeonggi-do (KR)

(72) Inventors: Cheolho Cheong, Seoul (KR); Yoonjeong Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 298 days.

(21) Appl. No.: 14/015,300

(22) Filed: Aug. 30, 2013

(65) Prior Publication Data

US 2014/0067770 A1   Mar. 6, 2014

(30) Foreign Application Priority Data

Sep. 5, 2012   (KR) .................. 10-2012-0098385

(51) Int. Cl.

| | |
|---|---|
| *G06F 7/00* | (2006.01) |
| *G06F 17/00* | (2006.01) |
| *G06F 11/00* | (2006.01) |
| *G06F 11/30* | (2006.01) |
| *G08C 25/00* | (2006.01) |
| *H03M 13/00* | (2006.01) |
| *H04L 1/00* | (2006.01) |
| *G05B 15/02* | (2006.01) |
| *G06F 11/10* | (2006.01) |
| *G06F 17/30* | (2006.01) |
| *G06F 21/10* | (2013.01) |

(Continued)

(52) U.S. Cl.
CPC .......... *G05B 15/02* (2013.01); *G06F 11/1048* (2013.01); *G06F 17/30303* (2013.01); *G06F 21/10* (2013.01); *H04N 21/47217* (2013.01); *H04N 21/4825* (2013.01); *G06F 2221/0775* (2013.01); *Y10S 707/913* (2013.01)

(58) Field of Classification Search
CPC .......... G06F 11/1048; G06F 17/30303; Y10S 707/913; G05B 15/02
USPC .................................. 707/687, 913; 714/746
See application file for complete search history.

(56) References Cited

U.S. PATENT DOCUMENTS

2005/0015270 A1* 1/2005 Kato et al. ................... 705/1
2007/0050191 A1* 3/2007 Weider et al. ............ 704/275
(Continued)

FOREIGN PATENT DOCUMENTS

| KR | 10-0436758 B1 | 6/2004 |
|---|---|---|
| KR | 10-2006-0085021 A | 7/2006 |

(Continued)

*Primary Examiner* — Usmaan Saeed
*Assistant Examiner* — Brian E. Weinrich
(74) *Attorney, Agent, or Firm* — Jefferson IP Law, LLP

(57) ABSTRACT

A method and apparatus for content management are provided. The method and apparatus efficiently manage content so as to provide a convenient user interface in an electronic device supporting content playback, browsing and storage. The method includes obtaining attribute information of a content item from a storage device, registering the attribute information in a content database, determining content items to be played back by a content player using the attribute information registered in the content database, creating a content list on the basis of the determined content items, displaying the content list, and playing back a content item selected by a user from the content list.

14 Claims, 7 Drawing Sheets

(51) Int. Cl.
*H04N 21/472* (2011.01)
*H04N 21/482* (2011.01)
*G06F 15/16* (2006.01)

(56) References Cited

U.S. PATENT DOCUMENTS

2007/0277196 A1* 11/2007 Steengaard et al. ............ 725/37
2009/0174768 A1*  7/2009 Blackburn et al. ..... 707/999.107
2010/0049989 A1*  2/2010 Lee ............................... 707/689
2013/0078990 A1*  3/2013 Kim et al. .................. 455/422.1
2014/0059599 A1*  2/2014 Sirpal et al. ..................... 725/37

FOREIGN PATENT DOCUMENTS

| KR | 10-2008-0058804 A | 6/2008 |
| KR | 10-0905657 B1 | 6/2009 |
| KR | 10-2010-0050338 A | 5/2010 |
| KR | 10-2010-098124 A | 9/2010 |

* cited by examiner

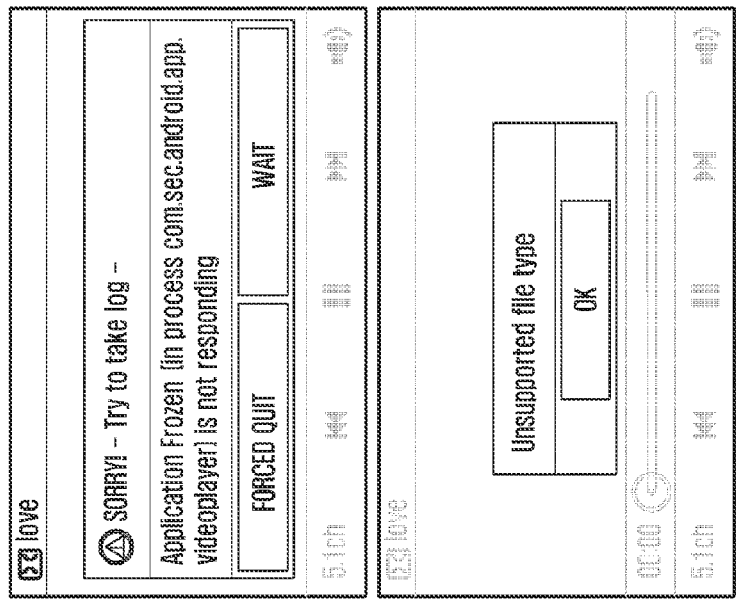
FIG. 1A
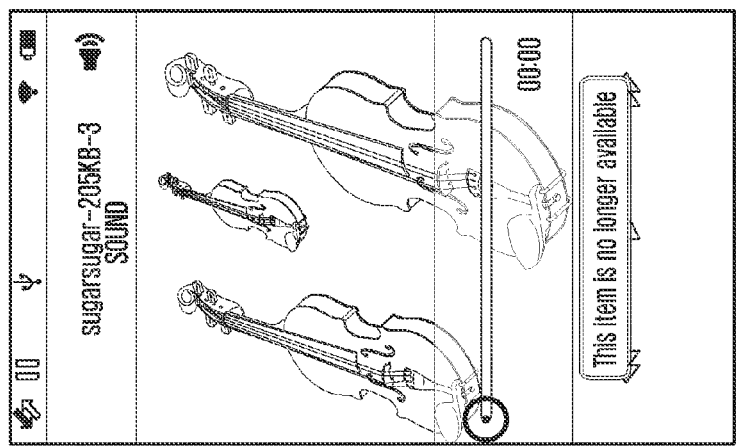
FIG. 1B
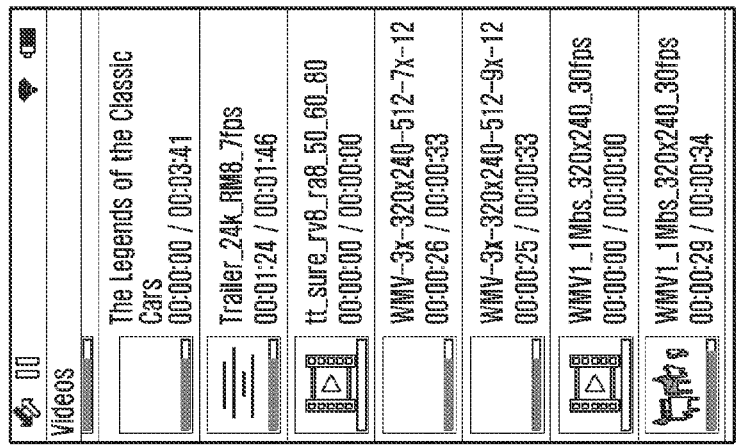
FIG. 1C
FIG. 1D

METHOD AND APPARATUS FOR CONTENT MANAGEMENT

CROSS-REFERENCE TO RELATED APPLICATION(S)

This application claims the benefit under 35 U.S.C. §119 (a) of a Korean patent application filed on Sep. 5, 2012 in the Korean Intellectual Property Office and assigned Serial No. 10-2012-0098385, the entire disclosure of which is hereby incorporated by reference.

TECHNICAL FIELD

The present disclosure relates to a method and apparatus for content management. More particularly, the present disclosure relates to a method and apparatus that efficiently manage content so as to provide a convenient user interface in an electronic device supporting content playback, browsing and storage.

BACKGROUND

Modern electronic devices manage and play back a variety of video, audio and image content. Types of content and amount of content have dramatically increased. In addition to existing personal computers, various electronic devices including portable electronic devices and home appliances are used to browse and manage content. Content is transferred between electronic devices for sharing and playback.

Content management enables a user to easily find and view a desired content item among files stored in an electronic device. To this end, the electronic device generates a list so that the user may browse, search for, and sort entries of the list. Hence, the user may find a desired content item in a relatively easy manner. In most cases, lists are generated on a content player basis or content type basis. For example, the electronic device may create a list of video content for a video player and a list of audio content for an audio player.

A typical electronic device classifies content items by type according to content file extensions. The electronic device may also identify the type of a content item by analyzing the header or structure of the content item. The most commonly used information for content classification is Multipurpose Internet Mail Extensions (MIME).

Generation of a content list requires content search and parsing. When content types are diverse and system performance is low, such list generation may require a lot of system resources and may take a long time. Further, a list generation may cause user inconvenience because an electronic device classifies content items by use of content extensions and MIME types. For example, extensions such as "3gp", "mp4" and "avi" indicate video content, and extensions such as "bmp", "png", "jpeg" and "gif" indicate image content. However, extensions may fail in content classification. For example, "dcf" is an extension for encoding in OMADRM (Open Mobile Alliance Digital Rights Management). An electronic device may encode at least one of images, video and audio into one file with an extension "dcf". The electronic device may identify the content type of a "dcf" file by decoding the file using a DRM decoder. For example, Android phones may classify content items by analyzing MIME types of the content items.

As limited information is used for list generation, a problem may occur during content playback. For example, playback of an unsupported content item or moving image may produce sound only. Fast Forward/Rewind (FF/RW) operations may fail, or playback may produce noise or stop as a result of abnormal data streams. In the case of DRM content, playback or browsing may be blocked when a playback limit is reached or a playback duration expires. In some cases, the player program may abnormally end or the system stops. Such problems cause user inconvenience. For example, in the event that the electronic device is placed in a bag or pocket and performs MP3 playback in a continuous mode, when an error occurs while the user listens to music using a headset, the user may have to take the electronic device out of the bag or pocket and manipulate the electronic device in order to select a next song.

FIGS. 1A-1D show a content list and illustrate errors occurring during media content playback according to the related art.

Referring to FIGS. 1A-1D, FIG. 1A illustrates a content list according to the related art, and FIGS. 1B and 1C illustrate errors occurring during media content playback.

Moreover, as an error is not properly handled, the same problem associated with the error continues to recur. To solve the recurring error, a content item causing the problem may be removed. However, the user may have difficulty locating a content item to be deleted among many files. As a result, removing a content item from a content list may be easier than locating the content item to be deleted. However, removal of such a content item form a content list may cause other problems. For example, a content item not supported by one application may be supported by another application. Firmware update of the electronic device may solve this problem. In the event that a content item is playable but with some deficiencies in fast-forward, rewind or seek operation, deletion of the content item may be undesirable for the user, who has spent time and money to collect and manage content.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above mentioned problems and/or disadvantages and to provide at least the advantages described below. Accordingly, an aspect of the present disclosure is to provide a method and apparatus that control a content list and a user interface so as to enable the user to conveniently utilize content.

Another aspect of the present disclosure is also to provide a method and apparatus that enhance credibility of information presented to the user through a content list.

Another aspect of the present disclosure is also to provide a method and apparatus that present a user interface corresponding to a content list so as to enable the user to make best use of the content without inconvenience.

In accordance with an aspect of the present disclosure, a method for content management is provided. The method includes obtaining attribute information of a content item from a storage device, registering the attribute information in a content database, determining content items to be played back by a content player using the attribute information registered in the content database, creating a content list on the basis of the determined content items, displaying the content list, and playing back a content item selected by a user from the content list.

In accordance with another aspect of the present disclosure, an apparatus for content management is provided. The apparatus includes a wireless communication unit configured to exchange data with at least one external device, a storage unit configured to store content players, a touchscreen configured to provide a user interface for interaction with a user, and a control unit configured to control the wireless communication unit, the storage unit and the touchscreen, wherein the control unit obtains attribute information of a content item from a storage device, registers the attribute information in a content database, determines content items to be played back by a content player using the attribute information registered in the content database, creates a content list on the basis of the determined content items, controls the touchscreen to display the content list, and plays back a content item selected by the user from the content list, wherein the storage device is at least one of the storage unit and one of the at least one external device, and wherein the content database is maintained in at least one of the storage unit and one of the at least one external device.

In accordance with another aspect of the present disclosure, the method and apparatus for content management may provide credible content information through a content list and support convenient player utilization.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIGS. 1A-1D show a content list and illustrate errors occurring during media content playback according to the related art;

Throughout the drawings, it should be noted that like reference numbers are used to depict the same or similar elements, features, and structures.

DETAILED DESCRIPTION

Figure 2:
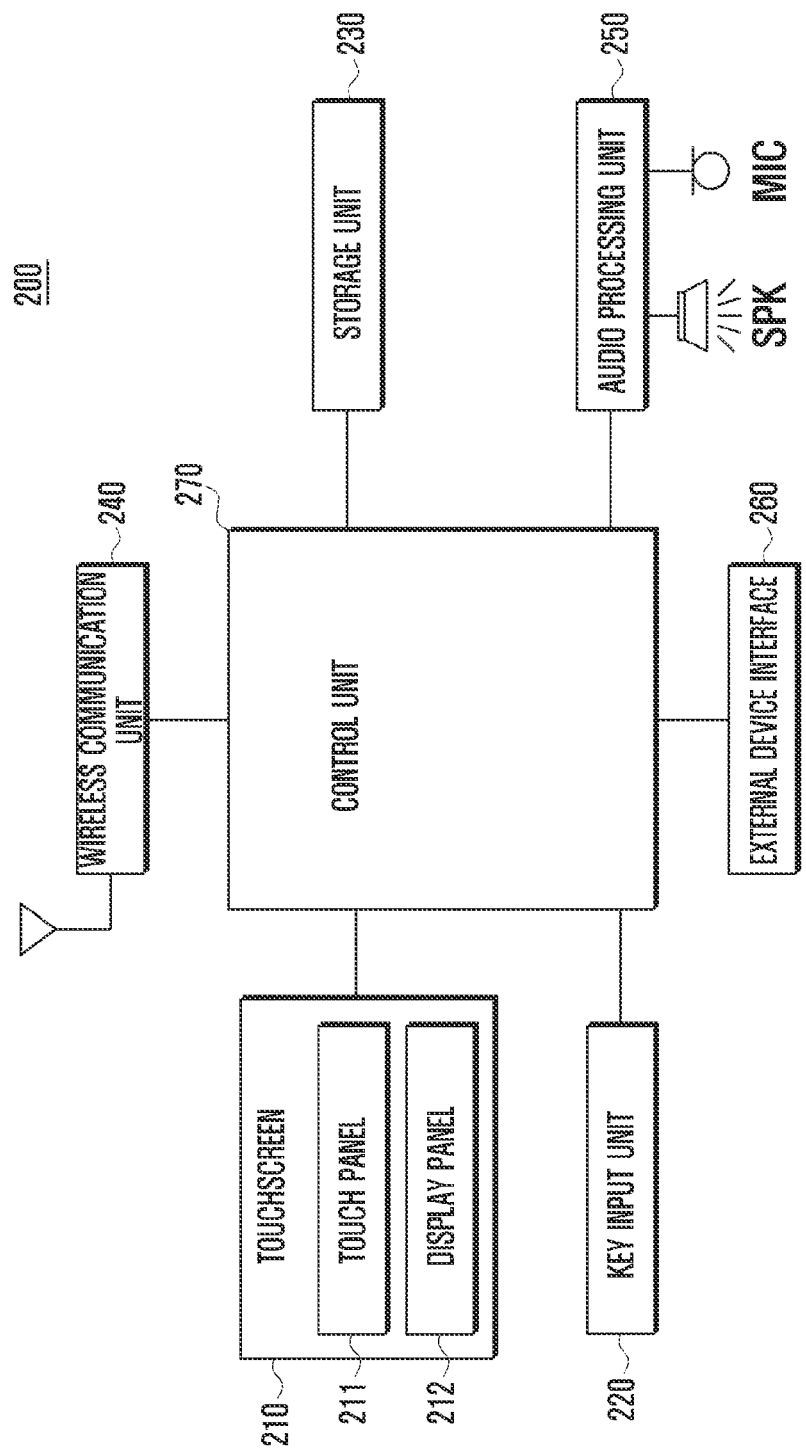
FIG. 2 is a block diagram of a content management apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The following description is focused on a mobile terminal. However, various embodiments of the present disclosure may also be applied to various electronic devices. As a non-exhaustive illustration only, according to various embodiments of the present disclosure, the electronic device may refer to a mobile terminal such as a smartphone, a mobile phone, a personal computer, a laptop computer, a tablet computer, a Portable/Personal Multimedia Player (PMP), a Personal Digital Assistant (PDA), a digital camera, a portable game console, or a handheld e-book, a server, a TV, a set-top device, a smart TV, a home appliance such as an Audio/Video (AV) device, a TV, a smart hub device, or a file server, a wearable computer, a computing device having a Head Mounted Display (HMD), and/or the like. In the description, a touchscreen is mainly used as an input means. However, other units such as a mouse, joystick, data glove and HMD may also be used as an input means.

According to various embodiments of the present disclosure, "content" refers to data that may be provided through the Internet or computer communication, such as text, email messages, photographs, images, audio, video, documents, and the like. Particular content may include a payload (such as text, email, photograph, image, audio, video, document, or the like) and attribute information describing the payload.

According to various embodiments of the present disclosure, attribute information may be used to classify content items and determine whether a specific content item is playable by a selected player. For example, attribute information may include information regarding an extension (or container), data size (e.g., 2 Mbytes), creation date, modification date, detailed information, error information, and/or the like. According to various embodiments of the present disclosure, detailed information is information obtained through parsing the corresponding content item in relation to, for example, data communication protocol, codec, play time, resolution, thumbnail, artist, playback duration, maximum number of plays, bit rate, Frames Per Second (FPS), media type, and the like. Error information is information related to errors occurring during content playback.

FIG. 2 is a block diagram of a content management apparatus according to an embodiment of the present disclosure.

Referring to FIG. 2, the content management apparatus 200 includes a touchscreen 210, a key input unit 220, a storage unit 230, a wireless communication unit 240, an audio processing unit 250 including a speaker (SPK) and microphone (MIC), an external device interface 260, and a control unit 270.

The touchscreen 210 is configured to provide a user interface for interaction with the user, and is composed of a touch panel 211 and a display panel 212.

The touch panel 211 may be placed on the display panel 212. The touch panel 211 generates an analog signal (e.g., a touch event) corresponding to a user gesture thereon, converts the analog signal into a digital signal (e.g., A/D conversion), and sends the digital signal to the control unit 270.

The control unit 270 detects a user gesture from the received touch event. A user gesture may be separated into a touch and a touch gesture. The touch gesture may include tap, drag, flick, or the like. For example, the touch indicates contact with the touchscreen and the touch gesture indicates change of the touch from touch-on to touch-off on the touchscreen.

According to various embodiments of the present disclosure, the touch panel 211 may be a composite touch panel, which includes a hand touch panel to detect a hand gesture and a pen touch panel to detect a pen gesture. The hand touch panel may be realized using capacitive type technology. The hand touch panel may also be realized using resistive type, infrared type, ultrasonic type technology, or the like. The hand touch panel may generate a touch event according to not only a hand gesture of the user but also a different object (e.g., an object made of a conductive material capable of causing a change in capacitance). The pen touch panel may be realized using electromagnetic induction type technology. Hence, the pen touch panel generates a touch event according to interaction with a stylus touch pen specially designed to form a magnetic field.

The display panel 212 converts video data from the control unit 270 into an analog signal and displays the analog signal under control of the control unit 270. For example, the display panel 212 may display various screens in the course of using the content management apparatus 200, such as a lock screen, a home screen, an environment setting screen, an application (abbreviated to "app") execution screen, a keypad, or the like. When the display panel 212 is turned on, the lock screen may be displayed on the display panel 212. When a user gesture for unlocking is sensed, the control unit 270 may change the lock screen into the home screen or app execution screen. The home screen may include many icons mapped with various apps related to, for example, environment setting, browsing, call handling and messaging. When an app icon is selected by the user (e.g., the icon is tapped), the control unit 270 may execute an app mapped to the selected app icon and display an execution screen of the app on the display panel 212. Under control of the control unit 270, the display panel 212 may display a first screen such as an app execution screen in the background and display a second screen such as a keypad in the foreground as an overlay on the first screen. The display panel 212 may display multiple screens so that the multiple screens do not overlap with each other under control of the control unit 270. For example, the display panel 212 may display one screen in a first screen area and display another screen in a second screen area. The display panel 212 may be realized using a display technology based on Liquid Crystal Display (LCD) devices, Organic Light Emitting Diodes (OLEDs), Active Matrix Organic Light Emitting Diodes (AMOLEDs), flexible display, digital ink, or the like.

The key input unit 220 may include a plurality of keys (buttons) for entering alphanumeric information and for setting various functions. Such keys may include a menu invoking key, a screen on/off key, a power on/off key, a volume adjustment key, and/or the like. The key input unit 220 generates key events for user settings and controlling functions of the content management apparatus 200 and transmits the key events to the control unit 270. Key events may be related to power on/off, volume adjustment, screen on/off, and the like. The control unit 270 may control the above components according to key events. Keys (buttons) on the key input unit 120 may be referred to as a hard key, and keys (buttons) displayed on the touchscreen 210 may be referred to as a soft key.

The storage unit 230 serves as a secondary memory unit for the control unit 270 and may include a disk, RAM, ROM, and flash memory. Under control of the control unit 270, the storage unit 230 may store data generated by the content management apparatus 200 or received from an external device (e.g., a server, desktop computer, or tablet computer) through the wireless communication unit 240 or the external device interface 260.

According to various embodiments of the present disclosure, the storage unit 230 stores an Operating System (OS) of the content management apparatus 200 and a variety of applications. In particular, the storage unit 230 stores content players and a content management program. Content players may include a video player, an audio player, an image viewer, a document viewer, or the like. The content management program implements a function that reads a content item from a storage device, obtains attribute information from the content item and registers the attribute information in a content database, a function that handles (generates, modifies, deletes, stores) a content list using attribute information stored in the content database, a function that outputs or displays a content list, a function that plays back a content item selected from the content list, a function that presents or display a user interface related to a content item being played back, a function that collects decoding information of a content item having caused an error during playback, and a function that registers collected decoding information in the content list and the content database. The storage device may be the storage unit 230 or an external device. For example, the control unit 270 may connect to an eternal device through the wireless communication unit 240 or the external device interface 260 and receive a content item and attribute information thereof from the external device. The content database may be formed in the storage unit 230 or in the external device. The decoding information includes error information collectable by a typical decoder, such as an error type (e.g., poor audio quality, image breakage, or noise generation) and an error location (e.g., a point in time at which playback failed). The decoding information may further include information entered by the user, such as error type, error location, corrective measures for an error, or the like.

The storage unit 230 may store embedded applications and third party applications. Embedded applications refer to applications installed in the content management apparatus 200 by default. For example, embedded applications may include a browser, email client, and instant messenger. As is widely known, third party applications include a wide variety of applications that may be downloaded from online markets and be installed in the content management apparatus 200. Such a third party application may be freely installed or uninstalled. When the content management apparatus 200 is turned on, a boot program is loaded into the main memory (e.g., RAM) of the control unit 270 first. The boot program loads the operating system in the main memory so that the content management apparatus 200 may operate. The Operating System (OS) loads a given program (particularly, content management program) in the main memory for execution. Such boot and loading process is widely known in the computer field and a further description thereof is omitted.

The wireless communication unit 240 performs communication for voice calls, video calls, and data calls under control of the control unit 270. To this end, the wireless communication unit 240 may include a radio frequency transmitter for up-converting the frequency of a signal to be transmitted and amplifying the signal, and a radio frequency receiver for low-noise amplifying a received signal and down-converting the frequency of the received signal. The wireless communication unit 140 may include a mobile communication module (based on 3G, 3.5G or 4G mobile communication), a digital broadcast reception module (e.g., a Digital Media Broadcasting (DMB) module), and a local area communication module (e.g., a Wi-Fi module, or a Bluetooth module), or the like.

The audio processing unit 250 inputs and outputs audio signals for speech recognition, voice recording, digital recording and calls in cooperation with the speaker SPK and microphone MIC. The audio processing unit 250 converts a digital audio signal from the control unit 270 into an analog audio signal through D/A conversion, amplifies the analog audio signal, and outputs the amplified analog audio signal to the speaker SPK. The audio processing unit 250 converts an analog audio signal from the microphone MIC into a digital audio signal through A/D conversion and sends the digital audio signal to the control unit 270. The speaker SPK converts an audio signal from the audio processing unit 250 into a sound wave and outputs the sound wave. The microphone MIC converts a sound wave from a person or other sound source into an audio signal.

The external device interface 260 is configured to connect to an external device such as a headphone, a smartphone, a desktop computer, or the like through a wired connection.

The control unit 270 controls the overall operation of the content management apparatus 200, controls signal exchange between internal components thereof, and performs data processing. The control unit 270 may include a main memory to store application programs and the operating system, a cache memory to temporarily store data to be written to the storage unit 230 and data read from the storage unit 230, a Central Processing Unit (CPU), and a Graphics Processing Unit (GPU). The OS serves as an interface between hardware and programs, and manages computer resources such as the CPU, GPU, main memory, and secondary memory. For example, the OS operates the content management apparatus 200, determines the order of tasks, and controls CPU operations and GPU operations. The OS controls execution of application programs and manages storage of data and files. As is widely known, the CPU is a key control component of a computer system that performs computation and comparison on data, and interpretation and execution of instructions. The GPU is a graphics control component that performs computation and comparison on graphics data, and interpretation and execution of instructions in place of the CPU. The CPU and GPU may be combined into a single integrated circuit package composed of two or more independent cores (e.g., quad cores). The CPU and GPU may be combined into a single chip as a System on Chip (SoC). The CPU and GPU may be combined into a multi-layer package. A structure including a CPU and GPU may be referred to as an Application Processor (AP).

Distinctive operations of the control unit 270 related to the present disclosure, namely content management, are described later with reference to the drawings.

Although possible variations are too numerous to enumerate given the pace of digital convergence, the content management apparatus 200 may further include a unit comparable to the above-described units, such as a GPS module, Near Field Communication (NFC) module, vibration motor, camera, acceleration sensor or gyro sensor. If necessary, one unit of the content management apparatus 200 may be removed or replaced with another unit.

Figure 3:
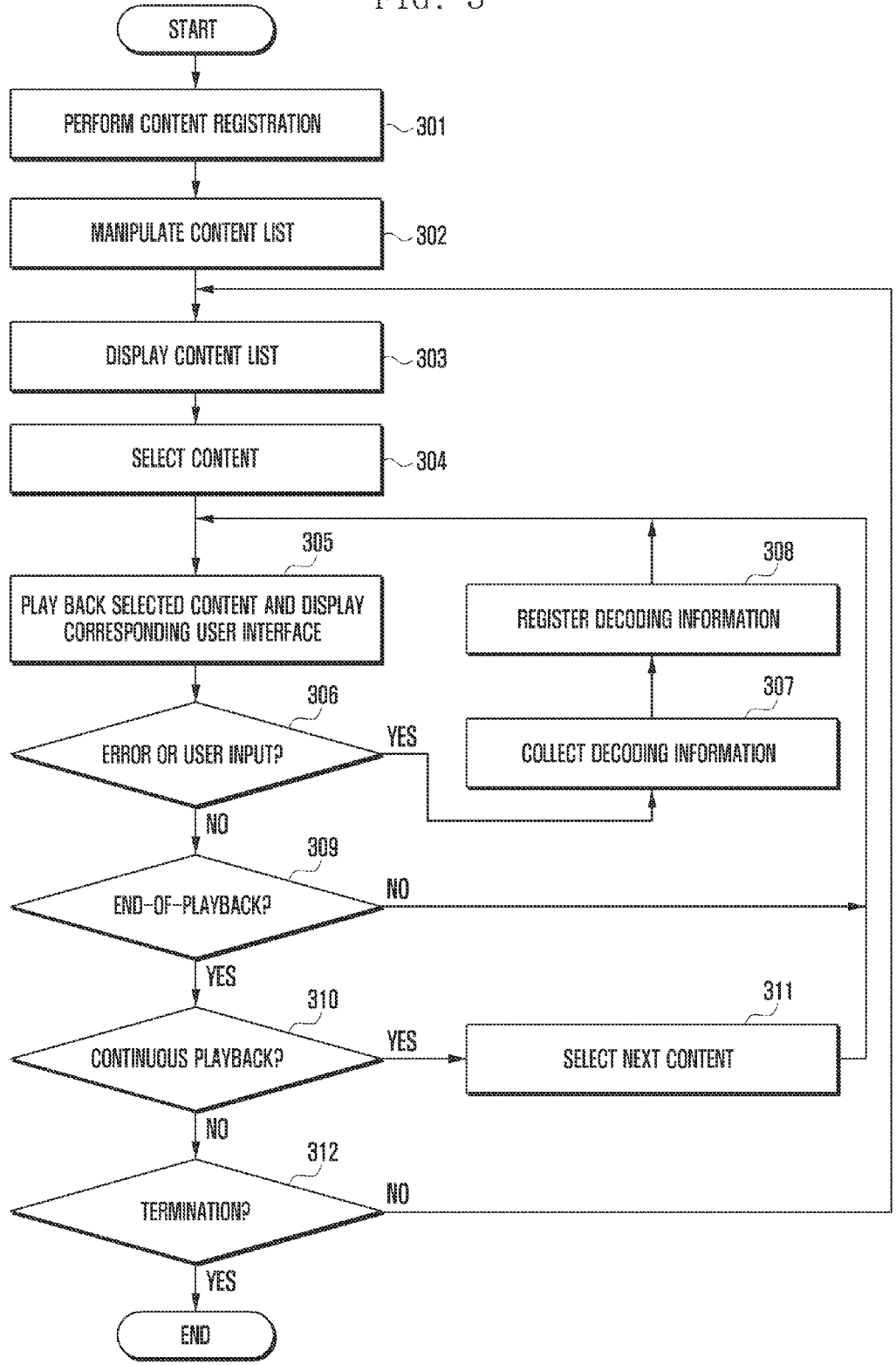
FIG. 3 is a flowchart of a content management method according to an embodiment of the present disclosure.

FIG. 3 is a flowchart of a content management method according to an embodiment of the present disclosure.

Referring to FIG. 3, at operation 301, the control unit 270 performs content registration. As an example, content registration involves obtaining and storing attribute information. The control unit 270 reads a content item from a storage device, obtains attribute information from the content item through analysis, and registers the attribute information in a content database. When the obtained attribute information is already registered, the control unit 270 may update the content database correspondingly. The control unit 270 may search for a new content item in the storage device, obtain attribute information from the new content item, and register the attribute information in the content database. The control unit 270 may directly access located content items and store attribute information of the content items in the content database. Alternatively, the control unit 270 may indirectly obtain attribute information from a different database or a lookup table and store the attribute information in the content database. The control unit 270 may directly or indirectly obtain attribute information.

According to various embodiments of the present disclosure, attribute information registered in the content database may be obtained by extracting attribute information of a content item or by analyzing the content item. The attribute information may include brief information on a content item such as direct or indirect path information for the content item (e.g., Uniform Resource Locator (URL) or website address indicating the location of a server storing the content item) or an index to the content item. The attribute information may also include detailed information on a content item such as MIME type, playback duration, media type (video, audio, or image), thumbnail, composer, producer, bit rate, Frames Per Second (FPS), resolution, or the like. Such detailed information is obtainable through analysis of a content item. For example, the control unit 270 may obtain detailed information by analyzing an ID3 tag for an MP3 file, exif (exchangeable image file format) data for a JPEG image, and ftyp or moov for an MPEG-4 file. When many content items are to be newly registered, obtaining detailed information through direct analysis of the content items may take a long time. As a result, according to various embodiments of the present disclosure, the control unit 270 may register only content extensions in the content database. The control unit 270 may extract information such as MIME type and audio or video codec information from a content header and register the extracted information in the content database.

At operation 302, control unit 270 performs content list handling at operation 302. For example, at operation 302, the control unit 270 determines content items to be played back by a content player and manipulates (e.g., generates, modifies, deletes, stores) a content list according to the determined content items.

Figure 4:
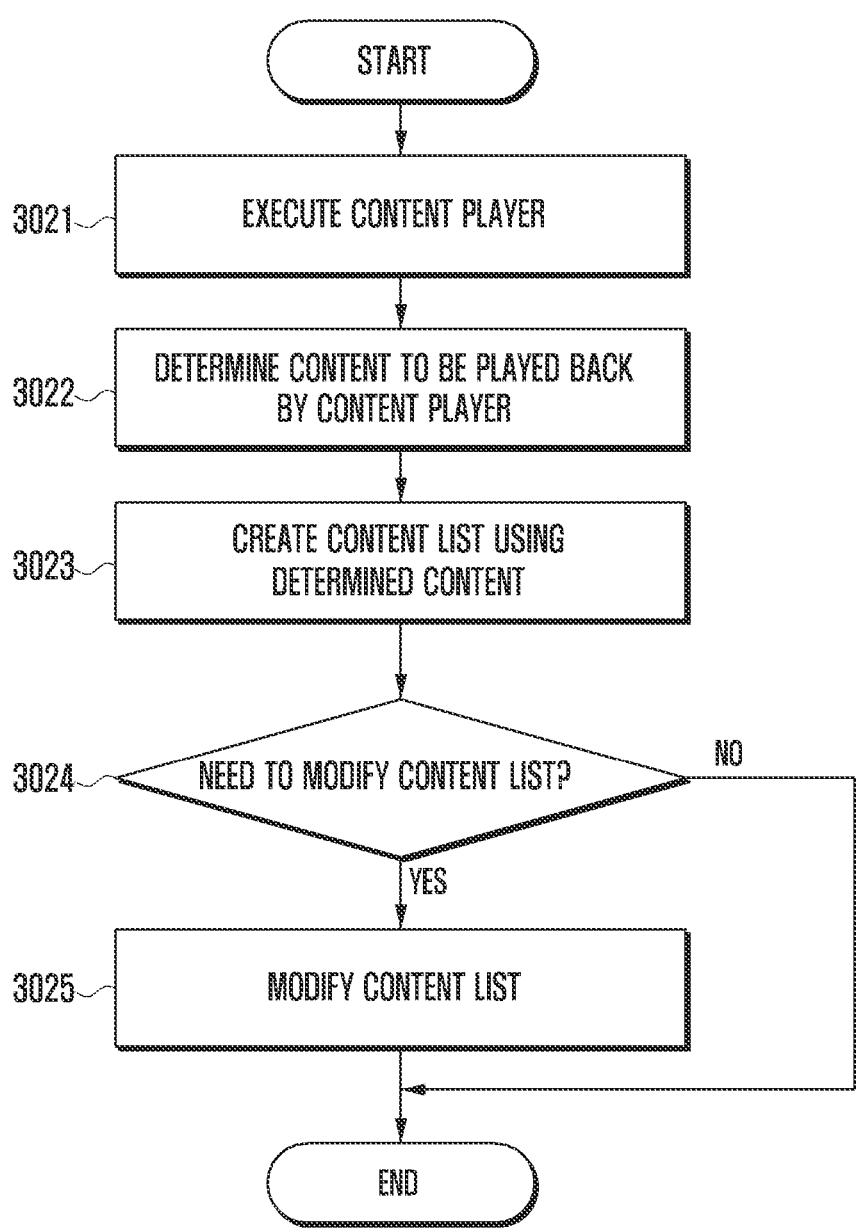
FIG. 4 is a flowchart of a procedure for content list manipulation in a content management method such as, for example, the content management method of FIG. 3 according to an embodiment of the present disclosure.

FIG. 4 is a flowchart of a procedure for content list manipulation in a content management method such as, for example, the content management method of FIG. 3 according to the related art.

Referring to FIG. 4, at operation 3021, the control unit 270 executes a content player according to a player request (e.g., tapping a player icon on the touchscreen 210 or the like).

At operation 3022, the control unit 270 determines content items to be played back by the content player. The content database stores content and associated attribute information. The content database may be built in the storage unit 230 or an external device. Alternatively, content may be stored in an external device and attribute information may be stored in the storage unit 230. Attribute information includes information regarding at least one of extension, data size, data communication protocol such as MIME, codec, play time, resolution, thumbnails, artist, playback duration, bit rate, Frames Per Second (FPS), and media type.

At operation 3023, the control unit 270 creates a content list using the determined content items. For example, when a video player is executed as the content player, the control unit 270 may determine content items with an extension "avi" or "wmv" in the content database as content items to be played back and create a content list using the determined content items. Lists for other content types such as audio and images may be created in a similar manner. In a simplistic approach, the control unit 270 may determine whether a content item is to be added to the content list on the basis of the extension and data communication protocol thereof registered in the content database. However, such information may be insufficient to determine whether a content item is to be added to the content list. For example, an extension may fail to identify content. For example, OMADRM-encrypted content has an extension "dcf". The control unit 270 may identify the media type by decrypting the encrypted content. According to various embodiments of the present disclosure, in some cases, the control unit 270 may have to check decodability of a specific content item. According to various embodiments of the present disclosure, when the content item is decodable, the content item is added to the content list; and when the content item is not decodable, the content item is not added to the content list. For example, content items may have the same extension "WMV" but have been encoded using different codec versions. When the decoder of the content player supports "WMV7" and "WMV8" but does not support "WMV9", a content item encoded in "WMV9" may be not decoded. It is necessary to modify the content list according to the types of codecs supported by the decoder. After creation of the content list, the control unit 270 may store the content list in response to a storage request (e.g., a tap on a "store" button on the touchscreen 210, or the like). The control unit 270 may store the content list in a content-type based list database (e.g., video database or audio database). The control unit 270 may classify content items in the content database according to content type. The control unit 270 may add tags and information on a content player to corresponding attribute information in the content database.

In a created content list, haptic feedback may be assigned to a content item having error information. For example, the control unit 270 may assign haptic feedback to a particular content item. When a content item with error information is selected by the user or is automatically selected through continuous playback, the control unit 270 presents haptic feedback to the user. Specifically, when the user selects a content item causing an error from the content list, the control unit 270 may generate vibration, piezoelectric effect, air pressure, electrostatic force or the like to attract the user's attention. To this end, according to various embodiments of the present disclosure, the content management apparatus 200 may include a vibration motor, an electro-active polymer, a piezo actuator, a heat generator, a cooler, a piezoelectric element, and/or the like. The control unit 270 may output a sound notification through the speaker SPK. For example, the control unit 270 may control the audio processing unit 250 to output notification messages corresponding to individual error situations. When the user selects a content item having error information, the control unit 270 may control the touchscreen 210 to display a dialog or popup window requesting the user to confirm playback. When the user confirms playback through the dialog or popup window, the control unit 270 plays back the content item.

At operation 3024, the control unit 270 determines whether the created content list needs to be modified.

If the control unit 270 determines that the created content list does not need to be modified at operation 3024, then the control unit 270 may end the process for manipulating the content list.

In contrast, if the control unit 270 determines that the created content list needs to be modified at operation 3024 (e.g., when the content list needs to be modified), then the control unit 270 proceeds to operation 3025 at which the control unit 270 modifies the content list. For example, mp4 files are treated as a video file in most cases. Hence, the control unit 270 may add an mp4 file to a video list at first. When analysis of the mp4 file reveals that the mp4 file contains audio tracks only without a video track, the control unit 270 may determine to modify the video list. Namely, the control unit 270 may remove the mp4 file with audio tracks only from the video list and add the same to an audio list. Alternatively, the control unit 270 may add an indication that the mp4 file is composed of audio tracks only to the video list and the content database. When decryption of an encrypted content item reveals that the content item is not of video type but of audio type, the control unit 270 may remove the content item from a video list and add the same to an audio list. When decoding of a content item fails, the control unit 270 may remove the content item from a video list.

Referring back to FIG. 3, at operation 303, the control unit 270 outputs the content list. The control unit 270 controls the touchscreen 210 serving as an output means to display the content list. The content list may be output through the external device interface 260 to an external device. For example, the content list may be projected by a projector on an external screen or be displayed on a TV. Entries of the content list may be arranged in various forms (e.g., linear horizontal arrangement, linear vertical arrangement, 2D matrix arrangement, random arrangement, or the like). For ease of description, entries of the content list are assumed to be laid out in a linear vertical arrangement. Other arrangements are also possible. Entries of the content list may be represented by thumbnails, icons, and content names. An entry or content item of the content list may have supplementary information such as playback duration, content type, and file size. Entries of the content list may be ordered according to type, modification date, name, or the like.

Figure 5B:
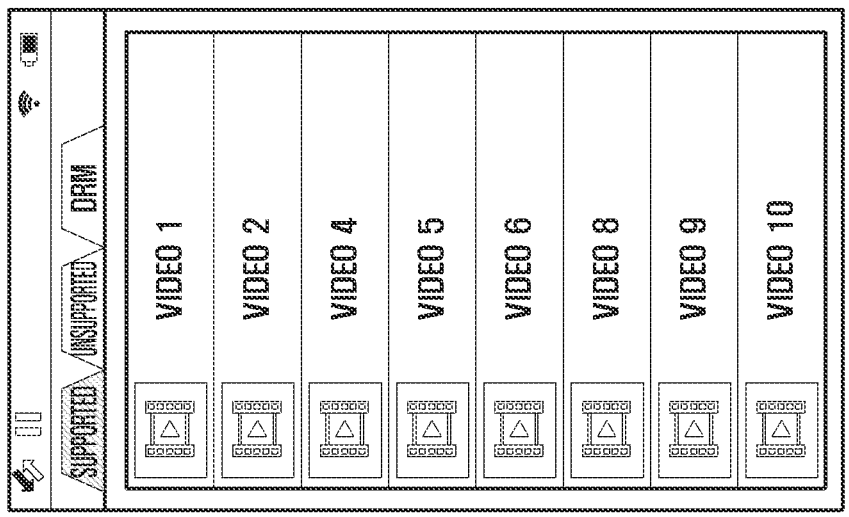
FIGS. 5A-5B illustrate schemes for displaying a content list according to an embodiment of the present disclosure.
Figure 5A:
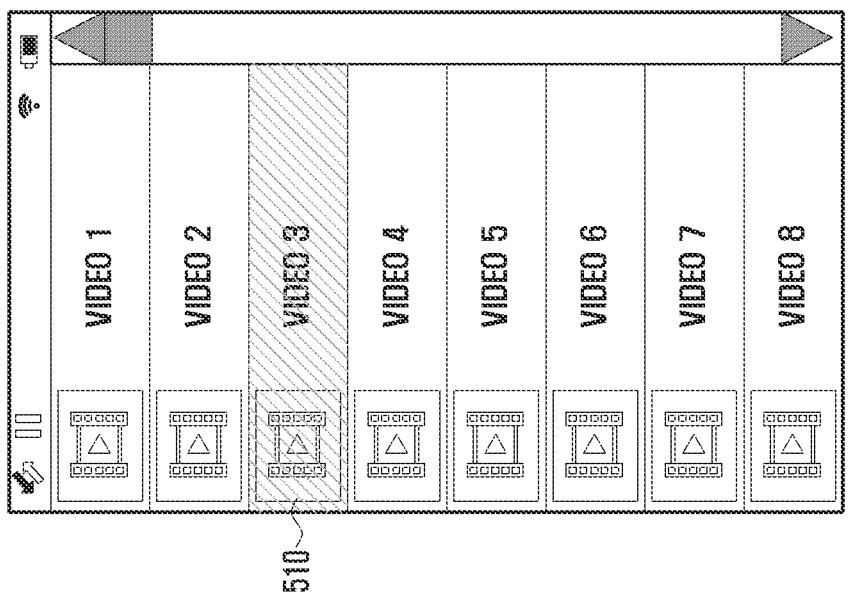

FIGS. 5A-5B illustrate schemes for displaying a content list according to an embodiment of the present disclosure.

Referring to FIGS. 5A-5B, the control unit 270 may control the touchscreen 210 to display content items in separate groups. Entries of the content list may be separated into a group of unplayable content items and another group of DRM content items. For example, as shown by FIG. 5A, in a content list, a content item 510 determined as unplayable may be shaded to indicate impossibility of selection. When a content item is a DRM file to be treated with caution, the content item may have a different color than other content items. As another example, as shown by FIG. 5B, the control unit 270 may separate entries of the content list into a supported group, an unsupported group, and a DRM group. Content items in the supported group are playable. In most cases, DRM-encrypted content is limited to a given number of plays, a given playback duration, or both. Hence, distinguishing DRM content items from other type content items may be desirable.

Figure 6A:
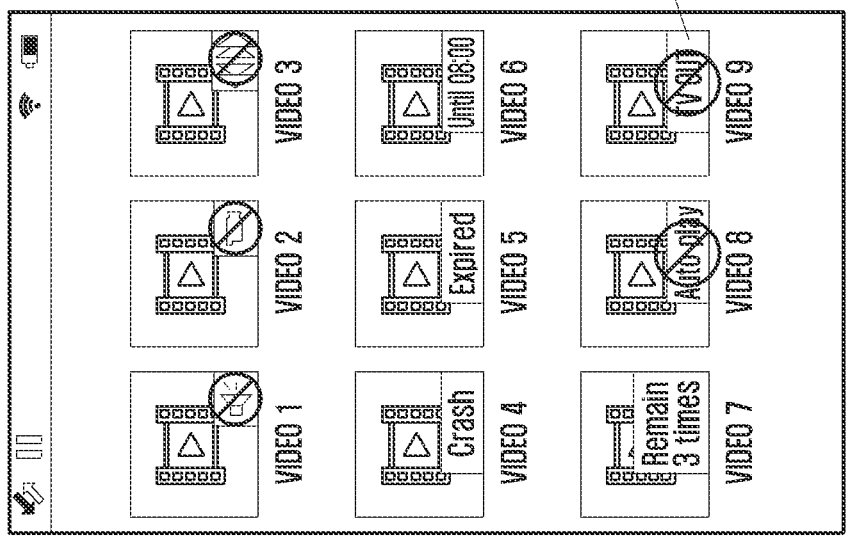
FIGS. 6A-6B illustrate schemes for displaying a content list according to an embodiment of the present disclosure.
Figure 6B:
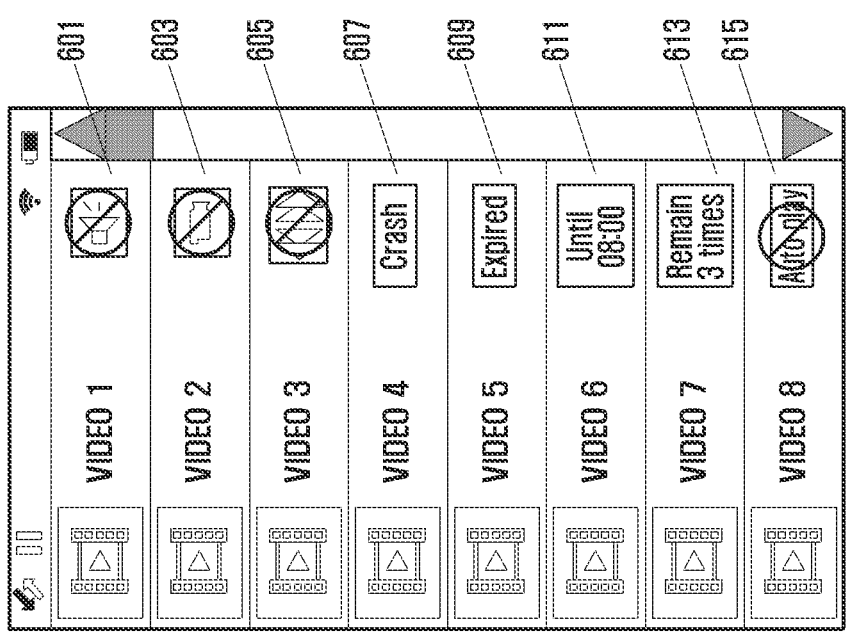

FIGS. 6A-6B illustrate schemes for displaying a content list according to an embodiment of the present disclosure.

Referring to FIGS. 6A-6B, the control unit 270 may control the touchscreen 210 to display unusual information for content items. The touchscreen 210 displays unusual information for content items in the content list under control of the control unit 270. For example, when a video item or audio item does not have a playback duration or produce an error upon application of the seek function (for setting a playback position), the control unit 270 controls the touchscreen 210 to output such unusual information for the corresponding item in the content list. For a video item, playback failure of a video track or audio track may be presented as unusual information to the user. According to various embodiments of the present disclosure, the control unit 270 may control the touch screen 210 to output an indication of various unusual information associated with a content item. The indication may be overlaid or juxtaposed with display of the content item.

Various unusual information is illustrated in FIGS. 6A-6B: no sound for video 1 as indicated by indicia 601, no video for video 2 as indicated by indicia 603, no seek function for video 3 as indicated by indicia 605, system error or serious error upon playback for video 4 as indicated by indicia 607, playback failure owing to expiration of the playback duration or excess of the playback count for DRM video 5 as indicated by indicia 609, playback permission until 08:00 for video 6 as indicated by indicia 611, three plays remaining for video 7 as indicated by indicia 613, no automatic playback for video 8 as indicated by indicia 615, and no TV-out output owing to DRM policies for video 9 as indicated by indicia 617. A variety of unusual situations related to playback such as non-support or unsupported resolution may be output in this way.

One important use of a content list is to support continuous playback. For example, when playback of one content item of the content list is ended, the next one is automatically played back. According to user settings, playback sequence may be randomly changed or one content item may be looped. For continuous playback, the control unit 270 may automatically exclude an unplayable content item from the playback sequence. Playback of a content item may fail owing to unsupported format, unsupported codec encoding, excess of playback count, expiration of playback duration, DRM error, internal error, or player or system error. The control unit 270 may determine a content item failing in playback as an unplayable content item and exclude such unplayable content items from the playback sequence. As illustrated in FIGS. 6A-6B, video 8 is an example of a content item excluded from an automatic playback sequence. The user may directly specify playback failure for a content item. For example, when a content item is selected (e.g., through a long tap or the like) from the content list, the control unit 270 may control the touchscreen 210 to output a user interface having a menu or button for setting or unsetting a non-playability indication.

At operation 304, the control unit 270 detects selection (e.g., tap or the like) of a content item in the content list.

At operation 305, the control unit 270 plays back the selected content item. According to various embodiments of the present disclosure, control unit 270 determines whether the selected content item is playable on the basis of attribute information thereof (e.g., extension, error information and setting information). When the selected content item is playable, the control unit 270 activates a corresponding player to play back the content item. When the selected content item is not playable as a result of errors, unsupported codec, non-playability indication or the like, the control unit 270 does not activate a player and controls the touchscreen 210 to output a corresponding error message. The error message may be output as sound. A typical image viewer provides a slideshow function, an automatic turn-over function, a wallpaper setting function, and exif information. An audio player such as an mp3 player provides an automatic turn-over function, a sound effect function (e.g., 3D sound, genre, equalization, sound field, or the like), a seek function such as FF/RW, a volume adjustment function, and supplementary information (e.g., composer, album image or the like). A video player provides various functions similar to those of an audio player and further provides an aspect ratio adjustment function and a screen size adjustment function.

At operation 305, the control unit 270 controls the touchscreen 210 to display a user interface corresponding to the selected content item. For example, when the selected content item includes a video track encoded through an unsupported codec, the control unit 270 may play back the selected content item using an audio player rather than a video player. Alternatively, the control unit 270 may reproduce sounds of the selected content item using a video player and control the touchscreen 210 to display a preset or default image (such as content name, playback information, error information, other pictures and advertisement). As another example, when the seek function fails in a portion of the selected content item, the control unit 270 may control the touchscreen 210 to display a seek user interface having a FF/RW icon and progress bar indicating partial seek failure. As another example, when the selected content item does not support audio, the control unit 270 may control the touchscreen 210 to deactivate or hide a volume adjustment key. The touchscreen 210 displays a popup, toast message or icon notifying unavailability of audio under control of the control unit 270.

At operation 306, the control unit 270 determines whether an error or user input is detected during content playback. An error, which has not been detected from attribute information or header information obtained through parsing, may occur during content playback. For example, when a defect is present in a data stream of the file, an error may occur at any time during playback. Such an error is hard to detect in advance. As another example, file header or metadata information may not match actual file data. A file with an extension "mp3" may actually be a WMA file. The most common error is related to unsupported content. The specifications of a content player may be not met as a result of various reasons such as resolution, file size, playback time, bit rate, and codec version. File damage or unidentifiable information may also cause an error.

If the control unit determines that an error is detected during content playback at operation 306 (e.g., when an error is detected during playback), the control unit 270 proceeds to operation 307 at which the control unit 270 collects decoding information. Decoding information refers to error information collectable by a decoder such as error type and error location. In addition, the control unit 270 may present a user interface enabling modification of collected decoding information. The user may modify, delete, and add error information such as error type and error location through the user interface. When an error is detected, the control unit 270 may provide corresponding feedback to the user. The control unit 270 may control the touchscreen 210 to output visual feedback (such as a popup window containing a warning message). The control unit 270 may control the touchscreen 210 to output auditory feedback (such as a warning sound). The control unit 270 may control a vibration motor or the like to output haptic feedback as described before.

Thereafter, at operation 308, the control unit 270 registers the collected or modified decoding information in the content list or content database. Various error information such as error type, error location, or error consequence are registered in the content list or content database. Hence, some information elements are modified in, deleted from or added to the content list or content database. For example, when the decoder sends an event indicating excessive resolution, the control unit 270 may add error information including "error type—resolution", "location—00:00:00" and "consequence—playback failure" to the content list or content database. Thereafter, when the content list is displayed, such error information is also presented. The corresponding content item is regarded as unplayable. As another example, when the playback position is changed from 00:01:30 to 00:02:30 during audio playback, playback may return to position 00:01:30 instead of proceeding to position 00:02:30. Such an error may occur when the corresponding content item is defective or when seek information is normal up to only position 00:01:30 and is abnormal thereafter. The control unit 270 may add error information including "error type—seek failure", "location—00:01:30 or later", and "consequence—return to 00:01:30" to the content list or content database.

Decoding information may include not only error information collectable by the decoder but also user information entered through a user interface such as a menu. For example, irregular images or sounds may be output at a specific location or time during video or audio playback. Such irregularity may pass undetected by the decoder but may be clearly noticeable to the user. In this case, the user may directly enter error information including "error type—poor reproduction", "location—from 00:10:00 to 00:10:15", and "consequence—broken image and noise" to the content management apparatus 200. The user may enter error information so as not to play back or browse a section of a content item. For example, error information may be used to skip or hide a portion of a video being regarded as fearsome or disgusting. The user may assign a password to such a portion of a video being regarded as adult content (e.g., content that may be fearsome or disgusting).

Figure 7B:
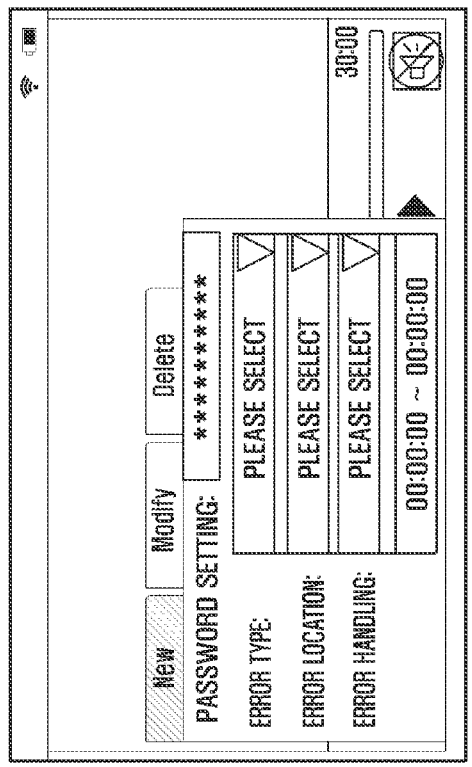
FIGS. 7A-7B illustrate user interfaces according to an embodiment of the present disclosure.
Figure 7A:
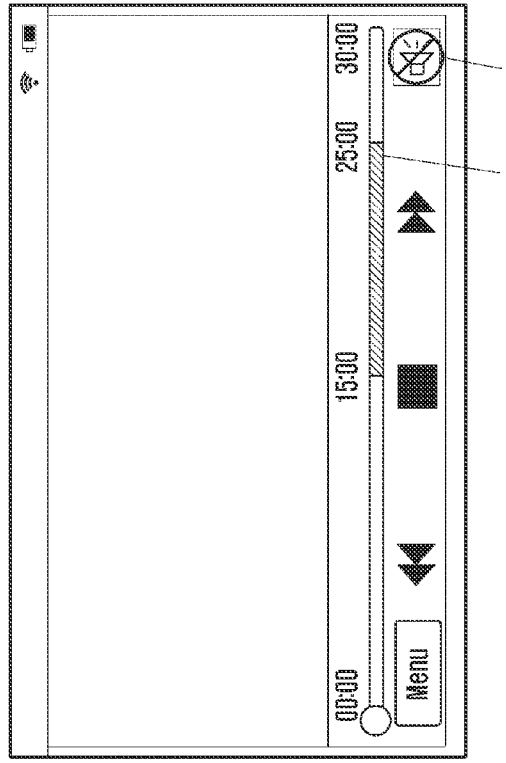

FIGS. 7A-7B illustrate user interfaces according to an embodiment of the present disclosure.

Referring to FIG. 7A, the speaker icon 701 indicates inability of volume adjustment and audio reproduction owing to a defective audio track though the video track is normal. The progress bar 703 indicates failure of the seek function between 15:00 and 25:00. When the current playback position is within a section where the seek function is not operable, the FF and RW icons are changed to a disabled state. The user may enter error information for video playback (e.g., error type, error location, error handling measure, or the like) through a user interface as shown in FIG. 7B.

Referring to FIG. 7B, the user may configure settings through such user interface to determine whether to play back a content item. For example, the control unit 270 may encrypt a password entered through the touchscreen 210 and store the encrypted password in the storage unit 230. Later, when a password is entered through the touchscreen 210, the control unit 270 may encrypt the entered password and, when the encrypted input password matches the pre-stored encrypted password, play back a section of a content item to which a password is assigned.

Referring back to FIG. 3, if the control unit 270 determines that an error or user input is not detected during content playback at operation 306, then the control unit 270 proceeds to operation 309 at which the control unit 270 determines whether playback of the selected content item is ended.

If the control unit 270 determines that playback of the selected content is not ended at operation 309, then the control unit 270 proceeds to operation 305.

In contrast, if the control unit 270 determines that playback of the selected content is ended at operation 309 (e.g., when playback of the selected content item is ended), then the control unit 270 proceeds to operation 310 at which the control unit 270 determines whether continuous playback is configured.

If the control unit 270 determines that continuous playback is configured at operation 310 (e.g., when continuous playback is configured), then the control unit 270 proceeds to operation 311 at which the control unit 270 selects the next content item from the content list. Thereafter, the control unit 270 returns to operation 305 to play back the next content item and present a corresponding user interface.

In contrast, if the control unit 270 determines that continuous playback is not configured at operation 310 (e.g., when continuous playback is not configured), then the control unit 270 proceeds to operation 312 at which the control unit 270 determines whether the player is stopped.

If the control unit 270 determines that the player is not stopped at operation 312 (e.g., when the player is not stopped), then the control unit 270 returns to operation 303 at which the control unit 270 controls the touchscreen 210 to output the content list.

In contrast, if the control unit 270 determines that the player is stopped at operation 312, then the control unit 312 stops playback.

In related art content playback, a content item causing a player trouble is not separately managed by the content list. Because the content item causing player trouble is not separately managed by the content list, the same problem continues to recur. Removing a troublesome content item from the content list may be undesirable because a content item not supported by one application may be supported by another application. Firmware update of the electronic device may solve the problem. In the event that a content item is playable but with deficiencies in some operations such as seek operation, deletion of the content item may be undesirable for the user, who has spent time and money to collect and manage content. In contrast, according to various embodiments of the present disclosure, the method and apparatus of the present disclosure manage content items of the content list in a classified manner to prevent various playback problems while maintaining presence (e.g., icons or thumbnails) of troublesome content items, thereby increasing usability of content. List based content playback of the present disclosure may be applicable to not only electronic devices but also All-Share or Digital Living Network Alliance (DLNA) devices supporting inter-device service sharing through a network.

According to various embodiments of the present disclosure, the content management method may be implemented as computer programs and may be stored in various non-transitory computer readable storage media. The non-transitory computer readable storage media may store program instructions, data files, data structures and combinations thereof. The program instructions may include instructions developed specifically for the present disclosure and existing general-purpose instructions. The non-transitory computer readable storage media may include magnetic media such as a hard disk and floppy disk, optical media such as a CD-ROM and DVD, magneto-optical media such as a floptical disk, and memory devices such as a ROM, RAM and flash memory. The program instructions may include machine codes produced by compilers and high-level language codes executable through interpreters. Each hardware device may be replaced with one or more software modules to perform operations according to the present disclosure.

While the present disclosure has been shown and described with reference to various embodiments thereof, it should be understood by those skilled in the art that many variations and modifications of the method and apparatus described herein will still fall within the spirit and scope of the present disclosure as defined in the appended claims and their equivalents.

What is claimed is:

1. A method for content management, the method comprising:
   obtaining attribute information of a content item from a storage device;
   registering the attribute information in a content database;
   determining content items to be played back by a content player using the attribute information registered in the content database;
   creating a content list on the basis of the determined content items;
   displaying the content list;
   playing back a content item selected by a user from the content list;
   determining whether an error is detected during playback of the selected content item;
   collecting, when the error is detected, decoding information related to the error as attribute information of the content item; and
   registering the collected decoding information in at least one of the content list and the content database,
   wherein the determining of content items to be played back comprises:
      determining content items to be played back by the content player using extensions, information on errors detected during content playback, user input information, playback duration, a number of permitted plays, codec information, data communication protocol, and media type,
      determining whether a content item has attribute information including error information, and
      when a content item is determined to include error information, regarding that content item as content not to be played back.

2. The method of claim 1, wherein the registering of the collected decoding information further comprises:
registering, when the error is detected, error information entered by the user.

3. The method of claim 1, further comprising:
providing, when the error is detected, haptic feedback to the user.

4. The method of claim 1, wherein the decoding information comprises information regarding at least one of a type of the error, and location of the error.

5. The method of claim 1, wherein the displaying of the content list comprises:
displaying with the content list at least one of error information, user input information, playback duration, and the number of permitted plays.

6. The method of claim 1, wherein the playing back of the selected content item comprises:
determining, when a password is assigned to the selected content item, whether to play back the selected content item according to the result of comparison between an input password and a pre-stored password.

7. The method of claim 1,
wherein the obtaining of the attribute information of the content item comprises obtaining attribute information of a content item from an external device through a transceiver, and
wherein the registering of the attribute information comprises registering the obtained attribute information in the content database.

8. The method of claim 1, further comprising:
displaying, when the selected content item has error information, a user interface screen showing information on features not supported by the content player.

9. The method of claim 1, wherein the creating of the content list comprises:
setting haptic feedback for a content item having error information in the content list.

10. The method of claim 1, wherein the error comprises at least one of a damage to a data stream of a file corresponding to the selected content item and unidentifiable information in the file.

11. An apparatus for content management, the apparatus comprising:
   a transceiver configured to exchange data with at least one external device;
   a memory configured to store content players;
   a touchscreen configured to provide a user interface for interaction with a user; and
   at least one processor configured to:
      control the transceiver, the memory, and the touchscreen,
      obtain attribute information of a content item from a storage device,
      register the attribute information in a content database,
      determine content items to be played back by a content player using the attribute information registered in the content database,
      create a content list on the basis of the determined content items,
      control the touchscreen to display the content list,
      play back a content item selected by the user from the content list,
      determine whether an error is detected during playback of the selected content item,
      collect, when the error is detected, decoding information related to the error as attribute information of the content item, and
      register the collected decoding information in at least one of the content list and the content database, wherein the storage device is at least one of the memory and one of the at least one external device, wherein the content database is maintained in at least one of the memory and one of the at least one external device, and wherein the at least one processor is further configured to:
  determine content items to be played back by the content player using extensions, information on errors detected during content playback, user input information, playback duration, a number of permitted plays, codec information, data communication protocol and media type,
  determine whether a content item has attribute information including error information, and
  when a content item is determined to include error information, regard that content item as content not to be played back.

12. The apparatus of claim 11, wherein the at least one processor is further configured to control the touchscreen to display with the content list at least one of error information, user input information, playback duration, and the number of permitted plays.

13. The apparatus of claim 11, wherein, when a password is assigned to the selected content item, the at least one processor is further configured to determine whether to play back the selected content item according to the result of comparison between an input password and a password stored in the memory.

14. The apparatus of claim 11, wherein the error comprises at least one of damage to a data stream of a file corresponding to the selected content item and unidentifiable information in the file.

\* \* \* \* \*